No. 798,615. PATENTED SEPT. 5, 1905.
J. A. MAYHEW.
PLEASURE RAILWAY.
APPLICATION FILED OCT. 28, 1904.

3 SHEETS—SHEET 1.

WITNESSES
a. J. McCauley
B. F. Finch

INVENTOR:
James A. Mayhew
BY Bakewell Cornwall
ATTY'S.

No. 798,615. PATENTED SEPT. 5, 1905.
J. A. MAYHEW.
PLEASURE RAILWAY.
APPLICATION FILED OCT. 28, 1904.
3 SHEETS—SHEET 2.
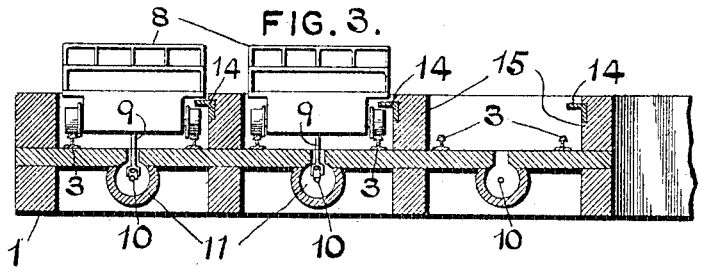
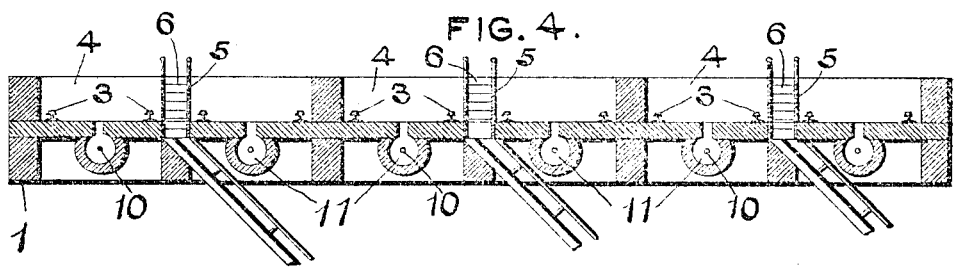
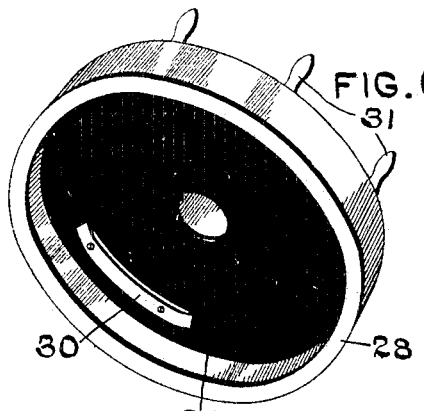
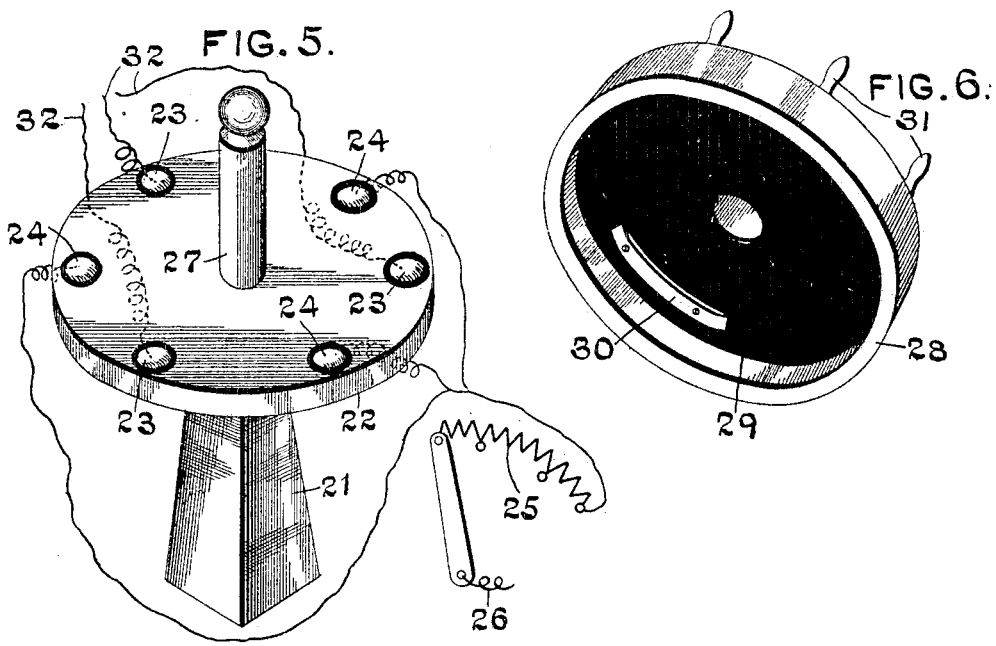
WITNESSES.
A. J. McCauley.
B. F. Finch
INVENTOR:—
James A. Mayhew
BY Bakewell Cornwall
ATT'Y'S.

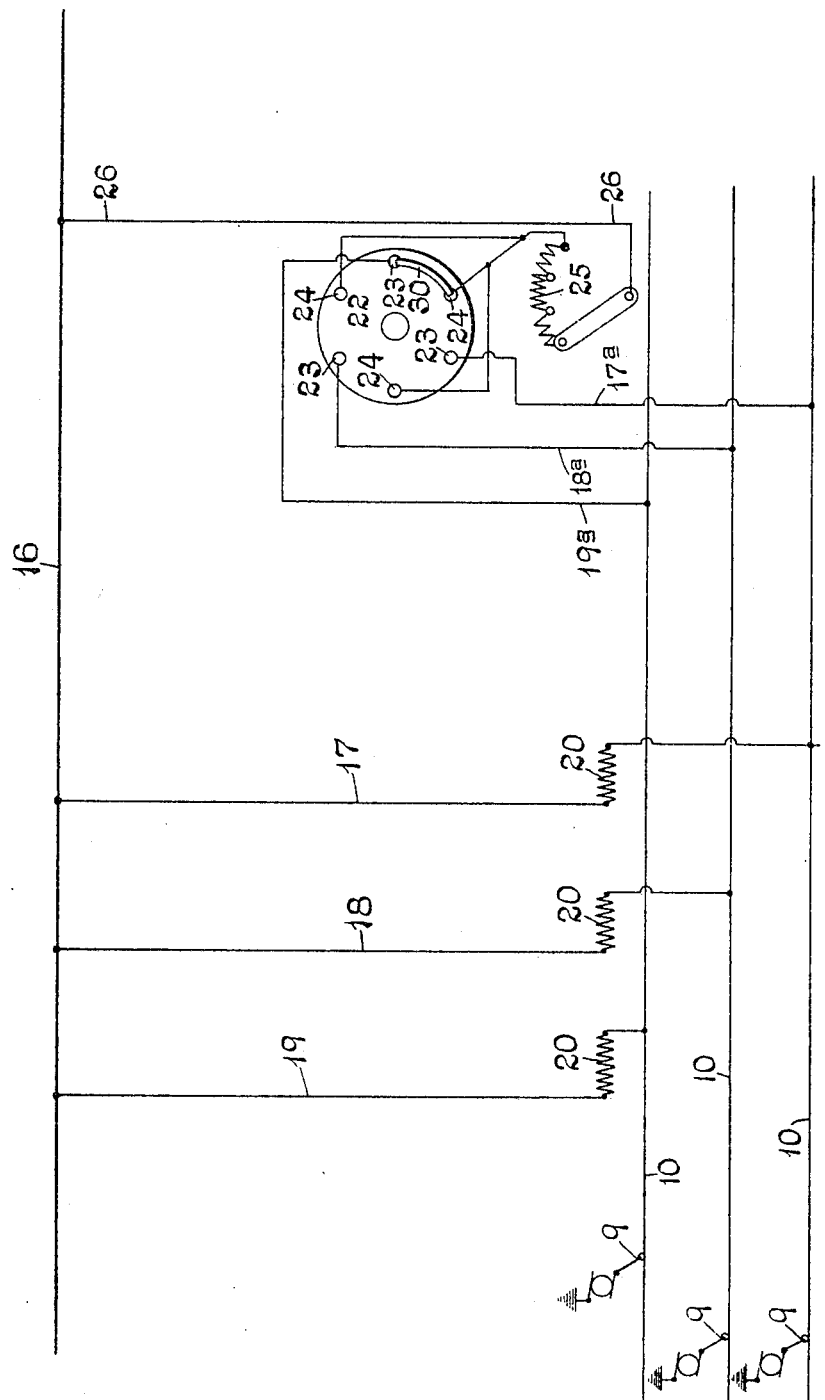

UNITED STATES PATENT OFFICE.

JAMES A. MAYHEW, OF ST. LOUIS, MISSOURI, ASSIGNOR OF ONE-FOURTH TO CARL ROBERTS, OF ST. LOUIS, MISSOURI.

PLEASURE-RAILWAY.

No. 798,615.      Specification of Letters Patent.      Patented Sept. 5, 1905.

Application filed October 28, 1904. Serial No. 230,348.

*To all whom it may concern:*

Be it known that I, JAMES A. MAYHEW, a citizen of the United States, residing at St. Louis, Missouri, have invented a certain new and useful Improvement in Pleasure-Railways, of which the following is a full, clear, and exact description, such as will enable others skilled in the art to which it appertains to make and use the same, reference being had to the accompanying drawings, forming part of this specification, in which—

Figure 1:
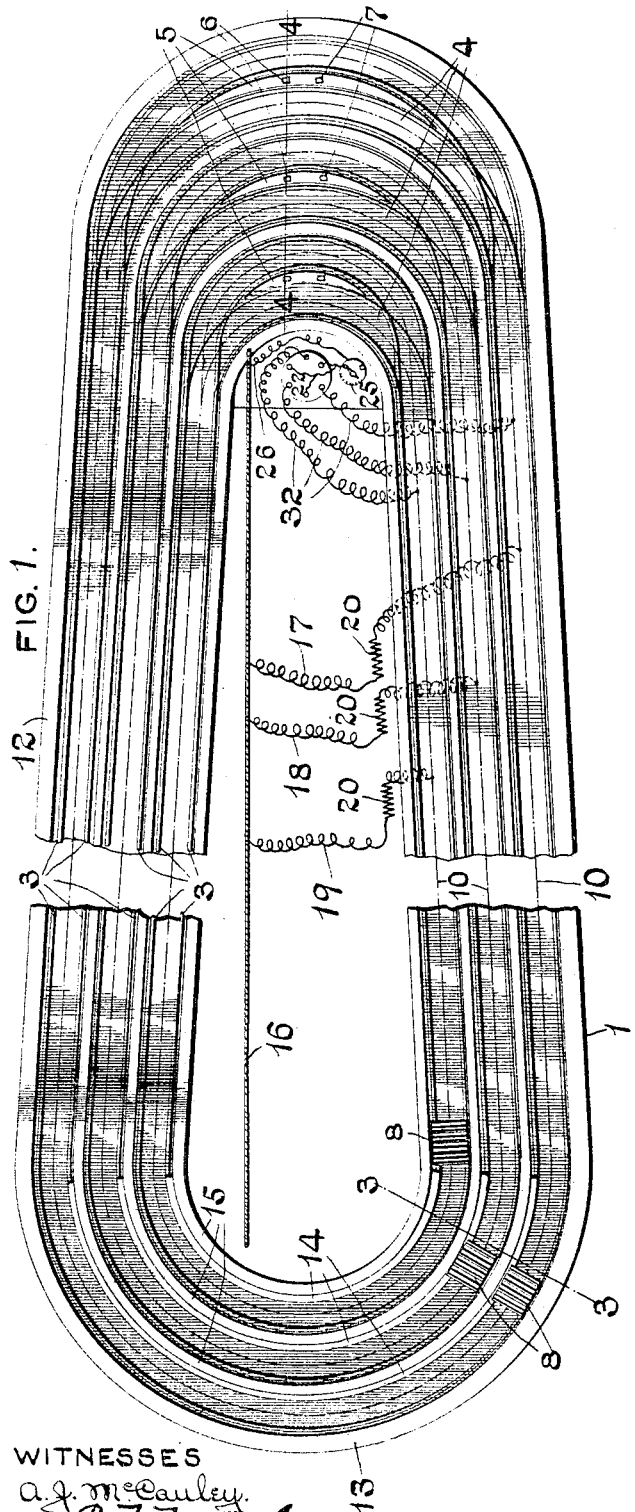
Figure 2:
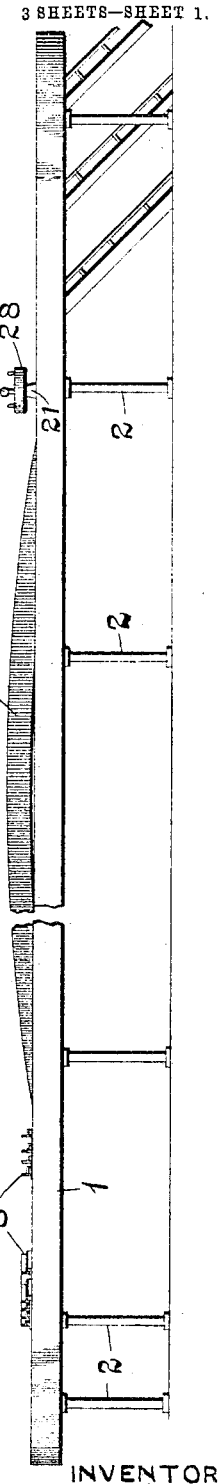

Figure 1 is a top plan view of a pleasure-railway constructed in accordance with my invention. Fig. 2 is a side elevational view of the same. Fig. 3 is a cross-sectional view on the line 3 3 of Fig. 1. Fig. 4 is a cross-sectional view on the line 4 4 of Fig. 1. Fig. 5 is a perspective view of a switch for increasing the voltage of the current to one of the conductors. Fig. 6 is a bottom perspective view of the switch-bridge, and Fig. 7 is a diagrammatical view showing the relative arrangement of the circuits and their coöperating elements.

This invention relates to pleasure-railways; and one of the objects thereof is to provide a plurality of tracks on which suitable objects, such as cars, are adapted to be propelled partly by an electric current and partly by gravity or entirely by electricity, as the case may be, a motor receiving current through a trolley from a suitable conductor, each conductor being adapted to receive a current of relatively high voltage, so as to accelerate the speed of the car passing over a particular track.

Another object of the invention is to provide means whereby the cars may be conveniently shunted from the main tracks for the purpose of permitting loading or unloading of the cars.

Other objects and advantages, as well as the novel details of construction of this invention, will be more specifically described hereinafter, it being understood that changes in the form, proportion, and minor details of construction may be resorted to without departing from the spirit or sacrificing any of the advantages thereof.

In the preferred form of my invention, as illustrated in the accompanying drawings, 1 designates a base suitably supported above the earth by the columns 2. This base supports a plurality of approximately elliptical tracks 3. At the starting end of the tracks are shunts 4, one for each track, which serve as sidings to permit the propelled objects or cars to be moved off of the main track—as, for example, when the cars are being filled. Interposed between the siding and its main track is a raised platform 5, having openings 6 and 7 leading onto stairways beneath the platform, whereby the passengers may enter and leave.

In order to illustrate the invention, I have shown the propelled objects as comprising cars 8. These cars may be propelled by any suitable motor through the medium of the trolley 9 on the conductor 10 in the conduit 11. In the present application I have shown three tracks with a corresponding number of cars. The tracks on one side of the platform are provided with raised portions 12, the upward inclination of which begins adjacent to the starting-point for each car. The cars may be raised over this portion 12, and the momentum obtained thereby in descending will assist in the pleasure of the occupants of the vehicle in passing over the platform. In order to obviate any liability of the car tilting or becoming derailed in rounding the curve at the end 13 of the platform, I provide guard-rails 14, which are secured to the partitions 15, dividing the several tracks.

Current is supplied to the conductors 10 from a main conductor-wire 16, through the branch wires 17, 18, and 19, in each of which is a resistance-coil 20. The resistance-coil 20 is placed in the path of the current passing through said wires 17, 18, and 19, so as to reduce the voltage entering the conductors 10, from which the motors on the cars 8 are energized, the wiring on the cars 8 being arranged in any well-known manner, and after passing through the motors the current may be grounded.

On a suitable standard 21 is a switch-disk 22, having spaced contacts arranged in pairs, each alternate contact 23 being connected to one of the conductors 10 and each alternate contact 24 being connected up to a rheostat 25, which rheostat is in turn connected to the main conductor-wire 16 through the medium of the branch wire 26. Rotatable on a spindle 27, carried by the disk 22, is a flanged disk 28, having an inner facing of insulation 29 and carrying a metallic contact-bridge 30, sufficient to bridge two of the contacts on the disk 22. This bridge-carrying disk is provided with handles 31, so that the same may be rotated to cause the bridge 30 to bridge any two of the contacts, and thereby causing the current to flow directly from the conductor 16 through any one of the wires $17^a$, $18^a$, or $19^a$, connected to any one of the contacts 23, into a particular conductor 10, and after passing through the motor to the ground to the source of energy, so that the particular conductor will have a voltage equal to the difference between the voltage which existed in the main conductor 16 and that obstructed by the presence of the resistance 25. This increased voltage would propel the car or object over the particular track at a greater speed than over any of the other tracks, and it is to be understood that the bridge 30 may be moved so as to bridge any of the contacts to cut in the circuit through one of the wires 32, and this for the sake of clearness I will term the "secondary" circuit. Of course it is to be understood that the speed of the car having the accelerated motor may be governed through the medium of the rheostat 25 under the control of the operator.

In order to make the operation of my device clear, I have shown cars applied to the tracks; but I reserve the right to use any fanciful vehicle or wheeled object as occasion may suggest. I also reserve the right to dispense with the inclined portion 12 of each track and instead thereof run the entire track level, or substantially so, without departing from my invention.

Having thus described the invention, what is claimed as new, and desired to be secured by Letters Patent, is—

1. In a pleasure-railway, the combination with a plurality of tracks, trolley-wires coöperating with said tracks, wheeled bodies having movement over the tracks and provided with motors receiving energy through the trolley-wires, a main conductor for supplying electricity to all of the trolley-wires through primary circuits, each circuit supplying the same voltage to the respective trolley-wires, secondary circuits of greater voltage than that of the primary circuits, and means for cutting in one of the secondary circuits; substantially as described.

2. In a pleasure-railway, the combination with a plurality of tracks, trolley-wires coöperating with said tracks, wheeled bodies having movement over the tracks and provided with motors receiving energy through the trolley-wires, a main conductor for supplying electricity to all of the trolley-wires through primary circuits, each circuit supplying the same voltage to the respective trolley-wires, secondary circuits of greater voltage than that of the primary circuits, and means for cutting in one of the secondary circuits, said means comprising a disk having spaced contacts and a bridge-piece for bridging the contacts; substantially as described.

3. In a pleasure-railway, the combination with a plurality of tracks, trolley-wires coöperating with said tracks, wheeled bodies having movement over the tracks and provided with motors receiving energy through the trolley-wires, a main conductor for supplying electricity to all of the trolley-wires through primary circuits, each circuit supplying the same voltage to the respective trolley-wires, secondary circuits of greater voltage than that of the primary circuits, and means for cutting in one of the secondary circuits, said means comprising a disk having spaced contacts and a rotatable bridge for spacing the contacts; substantially as described.

4. In a pleasure-railway, the combination with a plurality of tracks, trolley-wires coöperating with said tracks, wheeled bodies having movement over the tracks and provided with motors receiving energy through the trolley-wires, a main conductor for supplying electricity to all of the trolley-wires through primary circuits, each circuit supplying the same voltage to the respective trolley-wires, secondary circuits of greater voltage than that of the primary circuits, and means for cutting in one of the secondary circuits, said means comprising a disk having spaced contacts, a rotatable disk above the first-named disk and having an insulated facing, and a metallic bridge carried by the insulated facing for spacing two of the contacts; substantially as described.

5. In a pleasure-railway, the combination with a plurality of tracks, trolley-wires coöperating with said tracks, wheeled bodies having movement over the tracks and provided with motors receiving energy through the trolley-wires, a main conductor for supplying electricity to all of the trolley-wires through primary circuits, each circuit supplying the same voltage to the respective trolley-wires, secondary circuits of greater voltage than that of the primary circuits, and means for cutting in one of the secondary circuits, said means comprising a disk having spaced contacts, a flanged rotatable disk above the first-named disk and having an insulated facing, and a metallic bridge carried by the insulated facing for spacing two of the contacts; substantially as described.

6. In a pleasure-railway, the combination with a plurality of approximately elliptical tracks, each of which is provided with a portion on one side in a plane higher than the plane of the remaining portion of the tracks, cars propelled over said tracks, guard-rails at the curves in the tracks and lying in planes above the planes of the top of the wheels of the cars, a siding for each track, and a platform between the siding and main track having inlet and outlet openings communicating with stairways; substantially as described.

7. In a pleasure-railway, the combination with a platform having a plurality of substantially elliptical tracks, a siding at one curved end of each track, partitions between the respective tracks, and a platform having inlet and outlet openings and interposed between each siding and each main track; substantially as described.

8. The combination with a plurality of tracks, of circuits of the same electromotive force for propelling moving bodies over each of the tracks, secondary circuits of greater electromotive force, and a switch for throwing in any one of the secondary circuits to propel one of the moving bodies over one of the tracks at a greater speed than the speed of travel of the moving bodies over the remaining tracks; substantially as described.

9. The combination with a plurality of tracks, of circuits of the same electromotive force for propelling moving bodies over each of the tracks, secondary circuits of greater electromotive force, and a switch for throwing in any of the secondary circuits for propelling any one of the moving bodies over its particular track at a speed greater than the speed of the moving bodies traveling over the remaining tracks; substantially as described.

In testimony whereof I hereunto affix my signature, in the presence of two witnesses, this 24th day of October, 1904.

JAMES A. MAYHEW.

Witnesses:
  B. F. FUNK,
  GEORGE BAKEWELL.